United States Patent Office  3,842,123
Patented Oct. 15, 1974

3,842,123
METHYLENETETRACYCLINE FORMATE ESTER
Luigi Bernardi, Via Pinerolo 30; Roberto de Castiglione, Via Domenichino 38; and Vincenzo Colonna, Via C. Farini 72, all of Milan, Italy
No Drawing. Filed June 29, 1970, Ser. No. 50,908
Claims priority, application Italy, Aug. 8, 1969, 20,699/69; Sept. 4, 1969, 21,624/69
Int. Cl. C07c 103/28
U.S. Cl. 260—490                                    1 Claim

ABSTRACT OF THE DISCLOSURE

6 - Demethyl - 6 - deoxy - 6 - methylene-5-acyloxytetracyclines having antibiotic activity against tetracycline resistant strains. Also disclosed are the intermediates 11a-chloro - 6 - demethyl - 6 - deoxy - 6 - methylene - 5 - acyloxy-tetracyclines. Modes of preparation are given.

---

The present invention has as its object methylenetetracycline esters, their pharmaceutically acceptable non toxic acid addition salts and a process for the preparation thereof.

More particularly, the new tetracycline derivatives have the structure:

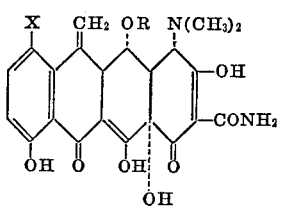

wherein R is a radical of an organic acid containing from 1 to 10 carbon atoms and X is selected from the group consisting of hydrogen, chloride and bromine and they have interesting antibacterial activity. This antibiotic activity against tetracycline resistant strains or good oral adsorption, are characteristic of these compounds.

The process for the preparation of the new esters consists in treating 11a-chloro-6-demethyl-6-deoxy-6-methylene-5-hydroxy-tetracycline III as the free base or its salt prepared as described and claimed in U.S. application Serial No. 48,521, filed June 22, 1970, claiming priority of Italian Patent Application No. 18792 A/69, filed June 27, 1969 by applicants, and now abandoned with an organic acid containing in its molecule from 1 to 10 carbon atoms in the presence of an agent selected from the group consisting of methanesulfonic, ethanesulfonic and hydrofluoric acids at a temperature between 20 and 70° C., over a period of from 2 to 20 hours.

The ester II thus obtained is then reduced to give the corresponding dechlorinated ester I. The reducing agent may consist of zinc in an acid medium, sodium and potassium hydrosulfites or hydrogen in the presence of catalysts. The process of the invention may be represented as follows:

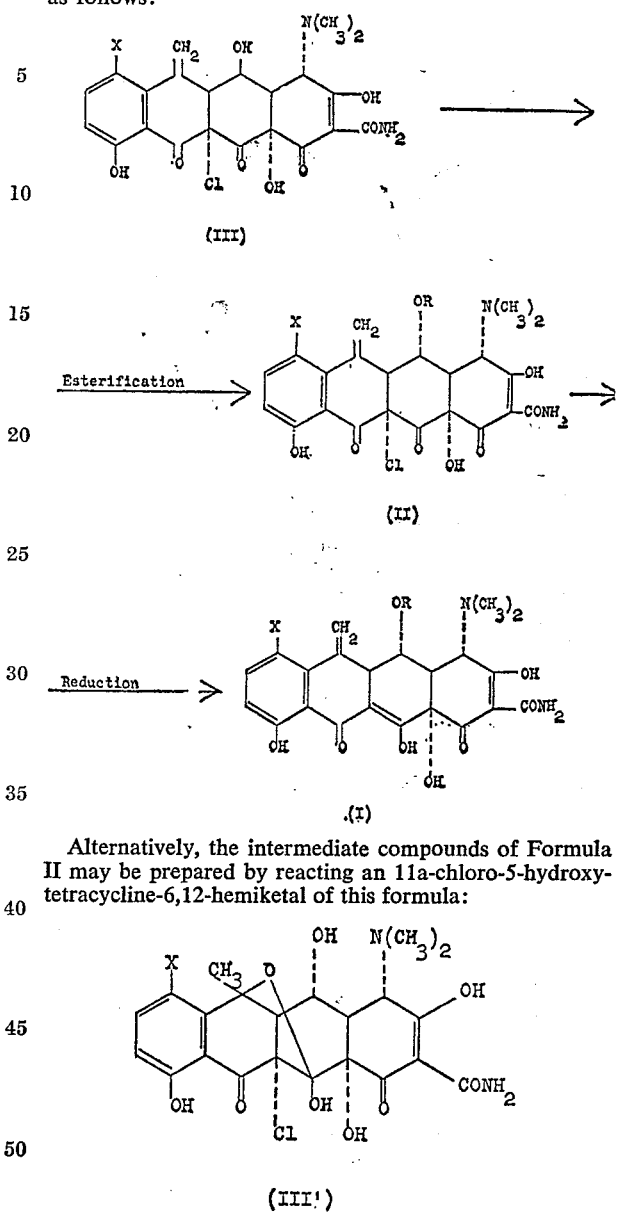

Alternatively, the intermediate compounds of Formula II may be prepared by reacting an 11a-chloro-5-hydroxy-tetracycline-6,12-hemiketal of this formula:

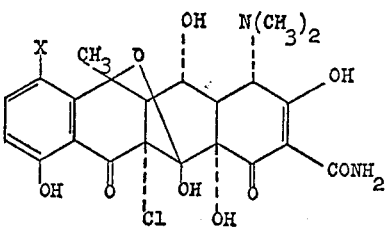

wherein X is hydrogen, chlorine or bromine with a mixture consisting of an organic acid having from 1 to 10 carbon atoms and an alkylsulfonic acid such as methanesulfonic acid or ethanesulfonic acid. The reaction is carried out at a temperature between 5 and 50° C., over a period from 5 to 25 hours. The 11a-chloro-6-demethyl-6-deoxy-6-methylene-5-hydroxy-tetracycline-5-monoester is isolated in the form of the free base or one of its salts.

According to this alternative, the complete sequence for preparing compound of Formula (I) is:

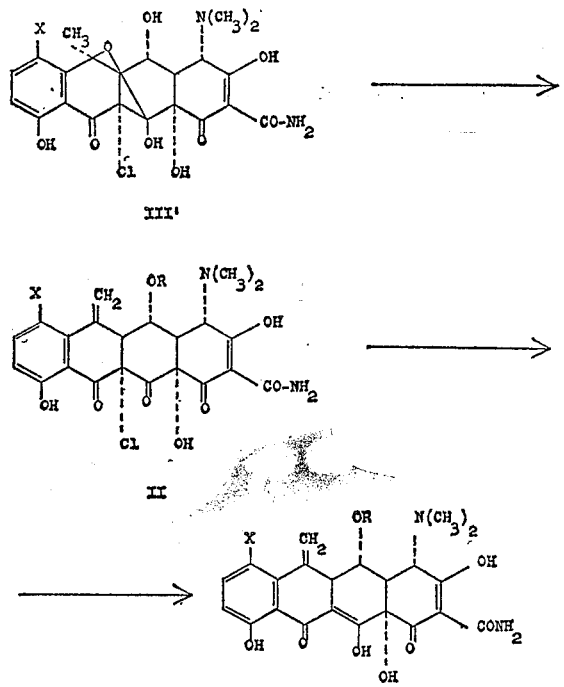

wherein R and X are as defined above.

Obviously, the alternative sequence gives better yields since the preparation of the intermediate compound III from III' can be avoided. The compounds (I) of the invention are particularly interesting as anti-bacterial drugs. Many of them develop a very strong antibacterial activity on tetracycline-resistant strains, while others show very good oral adsorption and give blood levels, which are higher than that given by metacycline or 6-demethyl-6-deoxy-6-methylene-5-hydroxy-tetracycline with which the compounds of the invention have a close structural analogy.

The activity against tetracycline resistant strains was tested in vitro in comparison with that shown by metacycline. Table I reports the values of the MIC or Minimal Inhibiting Concentration (in μg./ml.) which represents the minimum quantity of the substance capable of inhibiting completely, in vitro, the development of the tested organism.

TABLE I

MIC, μg./ml.

| Strains of clinic isolation Staphylococcus aureus | Metacycline | 6-demethyl-6-deoxy-6-methylene-5-isobutyriloxy-tetracycline |
| --- | --- | --- |
| DE-1 | 2.25 | 0.3 |
| DE-2 | >20 | 0.62 |
| DE-3 | 10 | 0.62 |
| DE-4 | >20 | 0.62 |
| DE-5 | >20 | 0.62 |
| DE-6 | 1.25 | ≤0.15 |

Table II reports the activity against tetracycline resistant Staphylococcus aureus ATCC 12715.

TABLE II

| Compound: | MIC, μg./ml. |
| --- | --- |
| 6 - demethyl - 6 - deoxy-6-methylene-5-oxy-tetracycline (metacycline) | >20 |
| 6 - demethyl - 6 - deoxy-6-methylene-5-acetyloxy - tetracycline | 5 |
| 6 - demethyl - 6 - deoxy-6-methylene-5-propionyloxy - tetracycline | 2.5 |
| 6 - demethyl - 6 - deoxy-6-methylene-5-butyriloxy - tetracycline | 2.5 |

TABLE II—Continued

| Compound: | MIC, μg./ml. |
| --- | --- |
| 6 - demethyl - 6 - deoxy-6-methylene-5-isobutyrryloxy - tetracycline | 0.62 |
| 6 - demethyl - 6 - deoxy-6-methylene-5-pivalyloxy - tetracycline | 0.62 |
| 6 - demethyl - 6 - deoxy-6-methylene-5-diethylacetyloxy - tetracycline | 0.62 |
| 6 - demethyl - 6 - deoxy-6-methylene-5-capryliloxy - tetracycline | 0.62 |

Table III reports some results of a comparison trial in vivo between metacycline and the first member of the compounds of the present invention, i.e. 6-demethyl-6-deoxy - 6 - methylene-5-formyloxy-tetracycline. This test was carried out in the mouse (12 animals per group) infected intraperitoneously with Staphylococcus aureus PV and the tested antibiotics were orally administered 4, 24, 48 and 72 hours after the infection. The symbol $PD_{50}$ means "protective dose 50."

TABLE III

| Compound | Dosage, mg./kg. | Mortality, percentage by the 11th day | $PD_{50}$ |
| --- | --- | --- | --- |
| Control | | 100 | |
| Metacycline | 80 | 0 | |
| | 40 | 33 | |
| | 20 | 66 | 25 |
| | 10 | 92 | |
| 6-demethyl-6-deoxy-6-methylene-5-formyloxytetracycline | 80 | 0 | |
| | 40 | 16 | 15 |
| | 20 | 24 | |
| | 10 | 66 | |

From the above table, it is evident that the compound of the present invention shows a "protective dose 50" which is almost one half of the corresponding value of metacycline.

Table IV reports the blood levels of 6-demethyl-6-deoxy-6-methylene-5-formyloxy-tetracycline in comparison with those of metacycline after oral administration in the rabbit (3 animals per group) of 100 mg./kg. body weight in a single dose.

TABLE IV

| Compound | μg./ml. in serum after— | | |
| --- | --- | --- | --- |
| | 2 hours | 4 hours | 6 hours |
| Metacycline | 0.41 | 0.46 | 0.46 |
| 6-demethyl-6-deoxy-6-methylene-5-formyloxytetracycline | 1.49 | 1.27 | 0.89 |

The following Examples are given to illustrate the invention without, however, limiting it.

EXAMPLE 1

6-Demethy-6-deoxy-6-methylene-5-acetyloxy-tetracycline

A solution of 10 g. of 11a - chloro-6-demethyl-6-deoxy-6-methylene - 5 - hydroxy-tetracycline p-toluenesulfonate (tosylate) in a mixture of 50 cc. of glacial acetic acid and 50 cc. of 99–100% methanesulfonic acid was stirred at 45°–50° C. for 4 hours, then poured into 1500 cc. of ether. The oily, dark brown precipitate was filtered on an infusorial earth cake, then dissolved in methanol and decolored with charcoal. The methanol solution was concentrated under reduced pressure to a small volume and diluted with isopropanol. By further dilution with ether, the product separated. This was filtered, washed several times with anhydrous ether and dried in vacuo over phosphoric anhydride. Thus, 8 g. of 11a-chloro-6-demethyl-6-deoxy-6-methylene - 5 - acetyloxy-tetracycline mesylate were obtained [$R_f$=0.70 on Whatman paper no. 1 buffered at pH 4.6 with McElvain buffer and using as diluent, the upper layer of the solvent mixture: methylisobutyl-ketone-ethyl acetate-n. butanol-water (80:80:35:88)]. This product may be used as such for the subsequent step. The analytic sample was obtained as the 5-sulfosalicylate, obtained over the free base. The free base shows maxima in the U.V. at 238, 282 and 382 m$\mu$ in 0.01N MeOH-HCl (1:9) and at 235, 280 and 393 m$\mu$ in 0.01N NaOH. By infrared spectra (I.R.) (KBr) it shows a maximum between 3410 and 3458 cm.$^{-1}$ and other maxima at 1755, 1650, 1612, 1535, 1230 cm.$^{-1}$. By Nuclear Magnetic Resonance spectra (DMSO) it shows the following characteristic signals:

| | | |
|---|---|---|
| CH$_3$COO | $\delta$2.0 | s |
| N(CH$_3$)$_2$ | $\delta$2.4 | s |
| =CH$_2$ | $\{\delta$5.48 | s |
| | $\delta$6.00 | s |
| Aromatic protons | $\delta$6.9-7.8 m. | |

The 5-sulfosalicylate has maxima in the I.R. spectrum at 3340, 1765, 1740, 1675, 1640, 1280, 1220, 1160 and 1050 cm.$^{-1}$. By N.M.R. (DMSO) it shows the following characteristic signals:

| | | |
|---|---|---|
| CH$_3$COO | $\delta$2.1 | s |
| N(CH$_3$)$_2$ | $\delta$2.9 | s |
| =CH$_2$ | $\{\delta$5.5 | s |
| | $\delta$6.0 | s |
| Aromatic protons | $\delta$6.8-8.2 m. | |

Found percent: C, 50.10; H, 4.10; N, 4.19; O, 32.37; Cl, 4.88; S, 4.41. Calculated for C$_{24}$H$_{23}$ClN$_2$O$_9$·C$_7$H$_6$O$_6$S: C, 50.51; H, 3.97; N, 3.80; O, 32.56; Cl, 4.81; S, 4.35.

1 g. of 11a-chloro - 6 - demethyl - 6 - deoxy-6-methylene - 5 - acetyloxy-tetracycline free base (or its salt) was suspended in 20 cc. of methanol-water (1:1) and 0.60 g. of sodium hydrosulfite were added little by little. A solution was first obtained, which then became turbid. After 30 minutes, the solution was adjusted to pH 4 with N sodium hydroxide, diluted with water and extracted with ethyl acetate. The organic extracts were washed with water, dried over sodium sulfate and evaporated under reduced pressure. Crystallization from ether-petroleum ether yielded 0.69 g. of 6-demethyl - 6 - deoxy-6-methylene-5-acetyloxy-tetracycline, R$_f$=0.88.

The U.V. spectrum shows a maximum at 239 m$\mu$, an inflexion at about 270 m$\mu$ and another maximum at 343 m$\mu$ in MeOH–HCl 0.01N (1:9); a maximum at 234 m$\mu$, an inflexion at about 278 m$\mu$ and another maximum at 382 m$\mu$ in 0.01N NaOH. The N.M.R. spectrum (DMSO) shows the following characteristic maxima:

| | | |
|---|---|---|
| CH$_3$COO | $\delta$2.1 | s. |
| N(CH$_3$)$_2$ | $\delta$2.45 | s. |
| =CH$_2$ | $\delta$5.52 | Broad. |
| Aromatic protons | $\delta$6.8-7.7 m. | |

The compound is characterized as hydrochloride.

*Analysis.*—Calcd. for C$_{24}$H$_{24}$N$_2$O$_9$·HCl: C, 55.33; H, 4.85; N, 5.38; Cl, 6.8. Found (percent): C, 55.26; H, 5.21; N, 4.97; Cl, 7.03.

EXAMPLE 2

6-Demethyl-6-deoxy-6-methylene-5-acetyloxy-tetracycline 18.4 g. of hydrofluoric acid were bubbled in 16 cc. of glacial acetic acid, then 2 g. of 11a-chloro-6-demethyl-6-deoxy - 6 - methylene - 5 - hydroxy-tetracycline tosylate were added. The resulting solution was allowed to stand for 18 hours at room temperature. It was then poured into a saturated aqueous solution containing 57 g. of calcium chloride. The precipitate was filtered through an infusorial earth cake and the aqueous solution was extracted three times with butanol. The butanol extracts, washed with a little water, were concentrated *in vacuo* to a small volume. Dilution with petroleum ether yielded 1.4 g. of 11a-chloro - 6 - demethyl - 6 - deoxy - 6 - methylene - 5 - acetyloxy-tetracycline tosylate which, after reduction as described in Example 1, gave 6-demethyl - 6 - deoxy-6-methylene-5-acetyloxy-tetracycline.

EXAMPLE 3

11a-Chloro-6-demethyl-6-deoxy-6-methylene-5-acetyloxy-tetracycline 50 g. of 11a - chloro - 5 - hydroxy-tetracycline-6,12-hemiketal were suspended in 250 cc. of glacial acetic acid, then 250 cc. of methanesulfonic acid were added. The resulting solution was allowed to stand for 16 hours at room temperature. It was then poured into 10 liters of ether. The semi-oily dark brown precipitate was filtered through an infusorial earth cake, then dissolved in butanol and decolored with charcoal. The resulting clear light yellow solution was concentrated under reduced pressure and diluted with diethyl ether. After drying, 50–55 g. of the crude mesylate of 11a-chloro - 6 - demethyl-6-deoxy - 6 - methylene - 5 - acetyloxy-tetracycline were obtained: R$_f$=0.70 in chromatography on Whatman paper No. 1, buffered at pH 4.6 with McElvain buffer and using as diluent the upper layer of the solvent mixture: methylisobutylketone-ethyl acetate-n. butanol-water (80:80:35:88). (Farmaco Ed. Pr., *17*, 728 (1962)). To detect spots by the Wood lamp, the dsh was previously sprayed with an aqueous solution of 15% Na$_2$S$_2$O$_4$.

The free base, obtained from the mesylate by conventional techniques known in tetracyclines chemistry, shows adsorption maxima at the U.V. at 238, 282, and 382 m$\mu$ in CH$_3$OH:HCl 0.01N (1:9) and at 235, 280 and 393 m$\mu$ in NaOH 0.01N$^3$. The I.R. spectrum (KBr) shows an absorption maximum between 3410 and 3458 cm.$^{-1}$ and other maxima at 1755, 1650, 1612, 1535, 1230 cm.$^{-1}$. The N.M.R. spectrum (DMSO) shows the following characteristic signals:

| | | |
|---|---|---|
| CH$_3$COO | $\delta$2.0 | s |
| N(CH$_3$)$_2$ | $\delta$2.4 | s |
| =CH$_2$ | $\{\delta$5.48 | s |
| | $\delta$6.00 | s |
| Aromatic protons | $\delta$6.97-7.8m. | |

The 5-sulfosalicylate has absorption maxima at the I.R. spectrum at 3340, 1765, 1740, 1675, 1640, 1280, 1220, 1160 and 1050 cm.$^{-1}$. The NMR (DMSO) spectrum shows the following characteristic signals:

| | | |
|---|---|---|
| CH$_3$COO | $\delta$2.1 | s |
| N(CH$_3$)$_2$ | $\delta$2.9 | s |
| =CH$_2$ | $\{\delta$5.5 | s |
| | $\delta$6.0 | s |
| Aromatic protons | $\delta$6.8-8.2 m. | |

EXAMPLE 4

6-Demethyl-6-deoxy-6-methylene-5-propionyloxy-tetracycline

Operating as described in Example 1, but employing propionic acid instead of acetic acid, there was obtained 11a - chloro - 6 - demethyl - 6 - deoxy - 6 - methylene-5-propionyloxy-tetracycline mesylate, R$_f$=0.80. The product was purified as the 5-sulfosalicylate.

*Analysis.*—Calcd. for C$_{25}$H$_{25}$ClN$_2$O$_9$·C$_7$H$_6$O$_6$S (percent): C, 51.17; H, 4.16; N, 3.73. Found (percent): C, 51.17; H, 4.28; N, 3.48.

The N.M.R. spectrum (DMSO) shows the following characteristic maxima:

| | | |
|---|---|---|
| CH$_3$—CH$_2$—COO | $\delta$1.05 | t  J=6.5 cps. |
| N(CH$_3$)$_2$ | $\delta$2.9 | s |
| =CH$_2$ | $\{\delta$5.5 | s |
| | $\delta$6.0 | s |
| Aromatic protons | $\delta$6.8-8.2 m. | |

11a-chloro - 6 - demethyl - 6 - deoxy - 6 - methylene-5-propionyloxy-tetracycline mesylate was then reduced as previously described and 6-demethyl - 6 - deoxy - 6 - methylene - 5 - propionyloxy-tetracycline hydrochloride was obtained, R$_f$=0.92.

The U.V. spectrum shows a maximum at 240 m$\mu$, an inflexion at 270 m$\mu$ and another maximum at 342 m$\mu$ in 0.01N MeOH-HCl (1:9).

The N.M.R. spectrum (DMSO) hydrochloride shows the following characteristic maxima:

| | | | |
|---|---|---|---|
| CH₃CH₂COO | δ1.1 | t | J=6.5 cps. |
| N(CH₃)₂ | δ2.9 | s | |
| =CH₂ | δ5.4 | Broad | |
| Aromatic protons | δ6.8–7.7 m. | | |

At the analysis.—found (percent): C, 56.91; H, 5.23; N, 5.36. Calcd. for C₂₅H₂₆N₂O₉·HCl: C, 56.12; H, 5.10; N, 5.24.

EXAMPLE 5

11a-Chloro-6-demethyl-6-deoxy-6-methylene-5-propionyloxy-tetracycline

Operating as described in Example 3, but employing propionic acid instead of acetic acid, 11a-chloro-6-demethyl-6-deoxy-6-methylene-5-propionyloxy - tetracycline mesylate was obtained ($R_f$=0.80) and subsequently the free base.

EXAMPLE 6

6-Demethyl-6-deoxy-6-methylene-5-butyryloxy-tetracycline

Operating as in Example 1 and employing butyric acid instead of acetic acid, 11a-chloro-6-demethyl-6-deoxy-6-methylene-5-butyryloxy-tetracycline mesylate is obtained; $R_f$=0.9. The product was purified as the 5-sulfosalicylate.

*Analysis.*—Found (percent): C, 53.74; H, 4.60; N, 4.08; Cl, 5.49; S, 2.76. Calcd. for $$C_{26}H_{27}ClN_2O_9 \cdot \tfrac{1}{2}C_7H_6O_6S$$

(percent): C, 54.00; H, 4.62; N, 4.27; Cl, 5.40; S, 2.44. The N.M.R. spectrum (DMSO) shows the following characteristic maxima:

| | | | |
|---|---|---|---|
| CH₃CH₂—CH₂—COO | σ0.9 | t | J=6 cps. |
| CH₃—CH₂—CH₂—COO | σ1.5 | m | |
| =CH₂ | {σ5.5, σ6.0} | s, s | |
| Aromatic protons | σ6.8–8.2 m. | | |

11a-chloro-6-demethyl-6-deoxy-6-methylene - 5 - butyryloxy-tetracycline mesylate was then reduced as previously described and 6-demethyl-6-deoxy-6-methylene-5-butyryloxy-tetracycline was obtained, $R_f$=0.94. The U.V. spectrum shows a maximum at 240 mμ, an inflexion at 270 mμ and another maximum at 344 mμ in 0.01N MeOH-HCl (1:9). The N.M.R. spectrum (DMSO) for the free base shows the following characteristic maxima:

| | | | |
|---|---|---|---|
| CH₃—CH₂—CH₂—COO | σ0.9 | t | J=6 cps. |
| CH₃—CH₂—CH₂—COO | σ1.6 m. | | J=6 cps. |
| CH₃—CH₂—CH₂—COO | σ2.8 | t | J=6 cps. |
| =CH₂ | σ5.5 | broad | |
| Aromatic protons | σ6.8–7.7 m. | | |

Analysis.—Calcd. for C₂₆H₂₈N₂O₉ (percent): C, 60.92; H, 5.52; N, 5.47; O, 28.09. Found (percent): C, 60.62; H, 5.52; N, 4.89; O, 27.71.

EXAMPLE 7

11a-Chloro-6-demethyl-6-deoxy-6-methylene-5-butyryloxy-tetracycline

Operating as described in Example 3, but employing butyric acid instead of acetic acid, 11a-chloro-6-demethyl-6-deoxy-6-methylene-5-butyryloxy-tetracycline mesylate was obtained, ($R_f$=0.90) and subsequently the free base.

EXAMPLE 8

6-Demethyl-6-deoxy-6-methylene-5-isobutyryloxy-tetracycline

Operating as in Example 1 and employing isobutyric acid instead of acetic acid there was obtained 11a-chloro-6-demethyl-6-deoxy-6-methylene - 5 - isobutyryloxy-tetracycline mesylate which was then reduced to 6-demethyl-6-deoxy-6-methylene - 5 - isobutyryloxy - tetracycline,  $R_f$=0.93. The U.V. spectrum in CH₃OH—HCl 0.01N shows maxima at 240 mμ; 275 inflexion, 345 mμ. The I.R. spectrum shows maxima at 1740, 1230 cm.⁻¹. The N.M.R. spectrum (DMSO) shows the following characteristic signals:

| | | |
|---|---|---|
| (CH₃)₂CH | σ1.11 | d |
| N(CH₃)₂ | σ2.9 | s |
| =CH₂ | σ4 | |
| Aromatic portons | σ6.8–7.7 m. | |

At the analysis.—Calcd. for C₂₆H₂₈N₂O₉·HCl (percent): C, 56.87; H, 5.33; N, 5.10; O, 26.23; Cl, 6.46. Found (percent): C, 56.66; H, 5.43; N, 5.09; O, 26.29; Cl, 6.50.

EXAMPLE 9

11a-Chloro-6-demethyl-6-deoxy-6-methylene-5-isobutyryloxy-tetracycline

Operating as in Example 3, but employing isobutyric acid instead of acetic acid, 11a-chloro-6-demethyl-6-deoxy-6-methylene-5-isobutyryloxy-tetracycline mesylate was obtained as was subsequently the free base.

EXAMPLE 10

6-Demethyl-6-deoxy-6-methylene-5-pivalyloxy-tetracycline

Operating as in Example 1 and employing pivalic acid instead of acetic acid, 11a-chloro-6-demethyl-6-deoxy-6-methylene-5-pivalyloxy-tetracycline mesylate was obtained which, on reduction, gave 6-demethyl-6-deoxy-6-methylene-5-pivalyloxy-tetracycline. The U.V. spectrum in 0.01N CH₃OH—HCl shows maxima at 239, 273 inflexion and 344 mμ. The I.R. spectrum (KBr) shows maxima at 1740 and 1230 cm.⁻¹.

The N.M.R. spectrum (CDCl₃) shows the following characteristic maxima:

| | | | |
|---|---|---|---|
| C(CH₃)₃ | δ1.21 | s | |
| N(CH₃)₂ | δ2.35 | s | |
| =CH₂ | {δ5.20, δ5.35} | d, d | J=2 cps., J=2 cps. |
| Aromatic protons | δ7.7–6.7 | | |

EXAMPLE 11

11a-Chloro-6-demethyl-6-deoxy-6-methylene-5-pivalyloxy-tetracycline

Operating as described in Example 3, but employing pivalic acid instead of acetic acid, 11a-chloro-6-demethyl-6-deoxy-6-methylene - 5 - pivalyloxy-tetracycline mesylate and subsequently the free base were obtained.

EXAMPLE 12

6-Demethyl-6-deoxy-6-methylene-5-caprylyloxy-tetracycline

Operating as in Example 1, but employing caprylic acid instead of acetic acid, there was obtained 11a-chloro-6-demethyl-6-deoxy-6-methylene-5-caprylyloxy - tetracycline mesylate, which then gave 6-demethyl-6-deoxy-6-methylene-5-caprylyloxy-tetracycline. The U.V. spectrum in 0.01N CH₃OH-HCl, it shows maxima at 239, 273 inflexion and 344 mμ. The I.R. spectrum (KBr) shows maxima at 1740 and 1230 cm.⁻¹. At the N.M.R. (DMSO) the free base shows the following characteristic maxima:

| | | |
|---|---|---|
| CH₃—CH₂—CH₂—CH₂—CH₂—CH₂—CH₂ | δ1.3 | Broad. |
| N(CH₃)₂ | δ2.5 | s. |
| =CH₂ | δ5.5 | Broad. |

EXAMPLE 13

11a-Chloro-6-demethyl-6-deoxy-6-methylene-5-caprylyloxy-tetracycline

Operating as in Example 3, but employing caprylic acid instead of acetic acid, 11a-chloro-6-demethyl-6- deoxy-6-methylene-5-caprylyloxy-tetracycline mesylate and subsequently the free base were obtained.

EXAMPLE 14

6-Demethyl-6-deoxy-6-methylene-5-diethylacetyloxy-tetracycline

Operating as in Example 1, but employing diethylacetic acid instead of acetic acid, 11a-chloro-6-demethyl-6-deoxy-6-methylene-5-diethylacetyloxy-tetracycline mesylate was obtained which then gave 6-demethyl-6-deoxy-6-methylene-5-diethylacetyloxy-tetracycline.

The U.V. spectrum in 0.01N $CH_3OH$-HCl shows maxima at 239, 273 inflexion and 344 m$\mu$. At the I.R. (KBr), it shows maxima at 1740, 1230 cm.$^{-1}$. At the N.M.R., the free base (DMSO) shows the following characteristic maxima:

| | | | |
|---|---|---|---|
| $CH_3$—$CH_2$ | $\delta 0.86$ | t | J=6 cps. |
| $CH_3$—$CH_2$ | $\delta 1.48$ | d | J=6 cps. |
| $N(CH_3)_2$ | $\delta 2.5$ | s | |
| =$CH_2$ | $\delta 5.5$ | Broad | |
| Aromatic protons | $\delta 7.7$-8.7 | | |

EXAMPLE 15

11a-Chloro-6-demethyl-6-deoxy-6-methylene-5-diethylacetyloxy-tetracycline

Operating as described in Example 3, but employing diethylacetic acid instead of acetic acid, 11a-chloro-6-demethyl-6-deoxy-6-methylene-5-diethylacetyloxy-tetracycline mesylate and subsequently the free base were obtained.

EXAMPLE 16

6-Demethyl-6-deoxy-6-methylene-5-formyloxy-tetracycline 20 g. of 11a-chloro-6-demethyl-6-deoxy-6-methyleneoxytetracycline para-toluenesulfonate and 100 cc. of 99% formic acid were poured into a polyethylene lined vessel. Then about 100 cc. of anhydrous hydrofluoric acid were added and the mixture was allowed to stand overnight at room temperature. A nitrogen flow was bubbled through the obtained product so as to remove the hydrofluoric acid. The residue was poured into about 2 liters of ethyl ether. It was stirred for 10 minutes and then filtered. The filtered cake was washed with ethyl ether and dried under vacuum. 16.9 g. of product are obtained as the para-toluenesulfonate.

16.9 g. of 11a-chloro-6-demethyl-6-deoxy-6-methylene-5-formyloxy tetracycline paratoluenesulfonate were dissolved in a glass containing 300 cc. of a methanol/water solution. 8.5 g. of sodium hydrosulfite were added and the mixture was allowed to stand at room temperature for 30 minutes. The pH of the mixture was adjusted to 4, the methanol was evaporated off and the residue was extracted 3-4 times with ethyl acetate. The extract was then washed with water and dried over anhydrous sodium sulfate. The solution was brought to a small volume, and by adding petroleum ether, a substance precipitated. This substance was filtered, washed with petroleum ether and dried under vacuum. 9.6 g. of product were obtained as the free base, of 6-demethyl-6-deoxy-6-methylene tetracycline, which was about 5–10% impure. The crude product was dissolved in about 100 cc. of the upper layer of the following solvent mixture: methylisobutylketone-ethyl acetate-n.butanol-0.1N citric acid-0.1N dibasic sodium phosphate, 48:48:21:55:55.

The thus obtained solution was shaken 2–3 times with the lower layer of said solvent mixture. It was then taken up with ethyl acetate, washed 2–3 times with water, and dried over anhydrous sodium sulfate. After decoloration with charcoal, the product was brought to a small volume and precipitated with petroleum ether. 7.3 g. of pure product were obtained (Yield 58%).

The U.V. spectrum [solution in $CH_3OH$/HCl 0.01N (1:9)] shows the following maxima:

| | | |
|---|---|---|
| $\lambda_{max}$ | 240 m$\mu$ | ($\epsilon$=20,173.) |
| | 273 m$\mu$ | ($\epsilon$=17,079.) |
| | 343 m$\mu$ | ($\epsilon$=11,881.) |

The I.R. spectrum (in KBr) shows the following bands at 1730 and 1170 cm.$^{-1}$ characteristic of esters.

The N.M.R. in $CDCl_3$, shows the following characteristic maxima:

| | | |
|---|---|---|
| —C=O (formiate) with H | $\delta 8.14$ | |
| $N(CH_3)_2$ | $\delta 2.49$ | s |
| =$CH_2$ | $\delta 5.44$ | 2d |
| Aromatic protons | $\delta 6.80$-7.70 | |
| $C_5$—H | $\delta 5.93$ | 2d |

The invention also includes the hitherto unknown compounds II which are intermediates in the preparation of compounds of the formula I. The term "deoxy" as used herein is also often called "desoxy."

What is claimed is:

1. 6-demethyl-6-deoxy-6-methylene-5-formyloxy-tetracycline.

References Cited

UNITED STATES PATENTS

| | | | |
|---|---|---|---|
| 3,579,564 | 5/1971 | Blackwood et al. | 260—473 |
| 3,047,617 | 7/1962 | Blackwood et al. | 260—490 |
| 2,812,349 | 11/1957 | Gordon | 260—490 |
| 3,069,467 | 12/1962 | Beereboom et al. | 260—559 |
| 3,272,817 | 9/1966 | Gordon et al. | 260—490 |

OTHER REFERENCES

Merck Index, 1968, 668–669.
Chem. Abstracts, 58: 4079d.
Chem. Abstracts, 58: 12487a.
Chem. Abstracts, 60: 482f.

VIVIAN GARNER, Primary Examiner

U.S. Cl. X.R.

260—346.2M, 410, 559AT; 424—227

PO-1050
(5/63)

UNITED STATES PATENT OFFICE
CERTIFICATE OF CORRECTION

Patent No. 3,842,123                         Dated   October 15, 1974

Inventor(s) Luigi BERNARDI et al

It is certified that error appears in the above-identified patent and that said Letters Patent are hereby corrected as shown below:

Column 1, line 42: "chloride" should read -- chlorine --.

Column 2, line 39: "this" should read -- the --.

Column 3, line 2: "compound" should read -- compounds --; line 32: After last formula should read -- I --; Table I, column 3, in the heading: "5-isobutyriloxy-" should read -- 5-isobutyrriloxy- --.

Column 4, line 17: "administered 4, 24," should read -- administered at 4, 24, --.

Column 6, line 22: "dsh" should read -- dish --; line 28: "0.01N$^3$." should read -- 0.01N. --; line 37: "$\delta$ 6.97-7.8m." should read -- $\delta$ 6.9-7.8m. --.

Column 8, line 10: "Calcd. for" should read -- Calcd. % for --; lines 10-11: delete "(percent)".

Column 10, line 20: "273 m$\mu$" should read -- 274 m$\mu$ --.

Signed and sealed this 11th day of March 1975.

(SEAL)
Attest:

RUTH C. MASON
Attesting Officer

C. MARSHALL DANN
Commissioner of Patents
and Trademarks